United States Patent
Nelken

(10) Patent No.: US 7,222,189 B1
(45) Date of Patent: *May 22, 2007

(54) SYSTEM AND METHOD FOR OPTIMIZING TIMING OF RESPONSES TO CUSTOMER COMMUNICATIONS

(75) Inventor: Yoram Nelken, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1292 days.

This patent is subject to a terminal disclaimer.

(21) Appl. No.: 09/624,361

(22) Filed: Jul. 24, 2000

Related U.S. Application Data

(63) Continuation-in-part of application No. 09/602,588, filed on Jun. 21, 2000, now Pat. No. 6,408,277.

(51) Int. Cl.
*G06F 15/16* (2006.01)

(52) U.S. Cl. .................. 709/238; 379/265.09

(58) Field of Classification Search ............... 379/265, 379/210.01, 265.02, 265.09, 265.1, 266.01, 379/266.03, 142.07, 265.01, 266.02; 709/206, 709/219, 203, 238, 239, 240, 217, 244; 374/477; 705/9; 707/10, 3
See application file for complete search history.

(56) References Cited

U.S. PATENT DOCUMENTS

| | | | |
|---|---|---|---|
| 5,040,141 A | | 8/1991 | Yazima et al. |
| 5,265,033 A | | 11/1993 | Vajk et al. |
| 5,311,583 A | * | 5/1994 | Friedes et al. ......... 379/210.01 |
| 5,377,354 A | | 12/1994 | Scannell et al. |
| 5,483,466 A | | 1/1996 | Kawahara et al. |
| 5,487,100 A | | 1/1996 | Kane |
| 5,493,692 A | | 2/1996 | Theimer et al. |
| 5,694,616 A | | 12/1997 | Johnson et al. |
| 5,721,770 A | * | 2/1998 | Kohler ................. 379/266.02 |
| 5,832,220 A | * | 11/1998 | Johnson et al. ............. 709/206 |
| 5,864,848 A | | 1/1999 | Horvitz et al. |
| 5,884,032 A | * | 3/1999 | Bateman et al. ........ 379/265.09 |
| 5,946,388 A | * | 8/1999 | Walker et al. ......... 379/265.02 |
| 5,974,465 A | | 10/1999 | Wong |

(Continued)

OTHER PUBLICATIONS

Breese et al, "Empirical Analysis of Predictive Algorithms for Collaborative Filtering," Proc. of the 14th Conf. on Uncertainty in Artificial Intelligence, Jul. 1998.

(Continued)

*Primary Examiner*—Marc D. Thompson
(74) *Attorney, Agent, or Firm*—Gates & Cooper LLP

(57) ABSTRACT

A system and method for optimizing timing of responses to customer communications comprises a contact center and an operations center. The operations center includes a decision module that receives each communication and determines whether a partial response, such as an acknowledgement that the communication was received, is required. If a partial response is required, a response module sends a partial response to the sender that indicates the communication was received and preferably includes an estimate of the time required for a full response to the communication. All received communications are forwarded to a queue to await processing by an agent. The decision module determines whether a partial response is required based on an estimate of the amount of time required for a full response. If the time estimate is less than a predetermined threshold, a partial response is not sent and the communication is forwarded to a queue for processing.

28 Claims, 4 Drawing Sheets

U.S. PATENT DOCUMENTS

| | | | |
|---|---|---|---|
| 6,021,403 | A | 2/2000 | Horvitz et al. |
| 6,035,104 | A | 3/2000 | Zahariev |
| 6,067,565 | A | 5/2000 | Horvitz |
| 6,182,059 | B1 | 1/2001 | Angotti et al. |
| 6,185,603 | B1 | 2/2001 | Henderson et al. |
| 6,282,565 | B1 | 8/2001 | Shaw et al. |
| 6,327,581 | B1 | 12/2001 | Platt |
| 6,353,667 | B1 * | 3/2002 | Foster et al. ............ 379/265.02 |
| 6,356,633 | B1 * | 3/2002 | Armstrong ............. 379/265.09 |
| 6,408,277 | B1 * | 6/2002 | Nelken ........................... 705/9 |
| 6,424,995 | B1 | 7/2002 | Shuman |
| 6,442,589 | B1 | 8/2002 | Takahashi et al. |
| 6,449,646 | B1 * | 9/2002 | Sikora et al. ................ 709/226 |
| 6,493,447 | B1 * | 12/2002 | Goss et al. ............ 379/265.09 |
| 6,560,330 | B2 * | 5/2003 | Gabriel .................. 379/265.02 |
| 6,611,535 | B2 * | 8/2003 | Ljungqvist .................. 370/477 |
| 6,654,815 | B1 * | 11/2003 | Goss et al. ................. 709/248 |
| 6,714,643 | B1 * | 3/2004 | Gargeya et al. ........ 379/265.02 |
| 6,744,878 | B1 * | 6/2004 | Komissarchik et al. 379/265.09 |
| 6,748,387 | B2 * | 6/2004 | Garber et al. ................. 707/10 |
| 6,754,335 | B1 * | 6/2004 | Shaffer et al. ......... 379/266.02 |

OTHER PUBLICATIONS

Czerwinski et al, "Visualizing Implicit Queries for Information Management and Retrieval," Proc. of CHI 1999; ACM SIGCHI Conf. on Human Factors in Computing Systems, 1999.

Dumais et al., "Inductive Learning Algorithms and Representations for Task Categorization," Proc. of 7th Intl. Conf. on Information & Knowlege Management, 1998.

Horvitz, "Principles of Mixed-Initiative User Interfaces," Proc. of CHI 1999; ACM SIGCHI Conf. on Human Factors in Computing Systems, 1999.

Horvitz et al., "Display of Information for Time-Critical Decision Making," Proc. of the 11th Conf. on Uncertainty in Artificial Intelligence, Jul. 1995.

Horvitz et al., "The Lumiere Project: Bayesian User Modeling . . . ," Proc. of the 14th Conf. on Uncertainty in Artificial Intelligence, Jul. 1998.

Horvitz et al., "Time-Dependent Utility and Action Under Uncertainty," Proc. of the 7th Conf. on Uncertainty in Artificial Intelligence, Jul. 1991.

Horvitz et al., "Time-Critical Action: Representations and Application," Proc. of the 13th Conf. on Uncertainty in Artificial Intelligence, Jul. 1997.

Koller et al., "Toward Optimal Feature Selection," Proc. of 13th Conf. on Machine Learning, 1996.

Lieberman, "Letizia: An Agent That Assists in Web Browsing," Proc. of International Joint Conference on Artificial Intelligence, 1995.

Platt, "Fast Training of Support Vector Machines Using Sequential Minimal Optimization," Advances in Kernel Methods: Support Vector Learning, MIT Press, Cambridge, MA, 1999.

Platt, "Probabilistic Outputs for Support Vector Machines & Comparisons to Regularized Likelihood Methods," Adv. in Large Margin Classifiers, MIT Press, Cambridge, MA, 1999.

Sahami et al. "A Bayesian Approach to Filtering Junk E-Mail," Amer. Assoc. for Art. Intell. Technical Report WS-98-05, 1998.

Cohen, "Learning Rules that Classify E-Mail," AT&T Laboratories, 1996.

Lewis, "Evaluating and Optimizing Autonomous Text Classification Systems," ACM SIGIR, 1995.

Lewis et al., "Training Algorithms for Linear Text Classifiers," ACM SIGIR, 1996.

Apte et al., "Automated Learning of Decision Rules for Text Categorization," ACM Transactions on Information Systems, vol. 12, No. 3, 1994.

Losee, Jr., "Minimizing Information Overload: The Ranking of Electronic Messages," Journal of Information Science 15, 1989.

Joachimes, "Text Categorization with Support Vector Machines: Learning with Many Relevant Features," Universitat Dortmund, Germany, 1998.

searchCRM.com Definitions (contact center), available at http://searchcrm.techtarget.com (accessed Jul. 5, 2005).

"Transforming Your Call Center into a Contact Center: Where are You? Trends and Recommendations," An IDC Executive Brief (#33); Jun. 2001.

Hawkins et al., "The Evolution of the Call Center to the 'Customer Contact Center,'" ITSC White Paper, Feb. 2001.

* cited by examiner

SYSTEM AND METHOD FOR OPTIMIZING TIMING OF RESPONSES TO CUSTOMER COMMUNICATIONS

CROSS-REFERENCE TO RELATED APPLICATION

This application is a continuation-in-part and claims the priority benefit of U.S. patent application Ser. No. 09/602,588 entitled "System and Method for Automatic Task Prioritization" filed Jun. 21, 2000 and now U.S. Pat. No. 6,408,277.

BACKGROUND OF THE INVENTION

1. Field of the Invention

This invention relates generally to electronic communication systems and more particularly to a system and method for optimizing timing of responses to customer communications.

2. Description of the Background Art

Organizations may interact with customers and others via a wide variety of communication channels. Text-based communication channels typically do not involve one-to-one contact with a representative of the organization. Customers may send e-mail, submit a web-based form, or send a facsimile and have some uncertainty as to whether the communication was received.

Organizations often address this uncertainty by immediately sending an acknowledgement to every communication. In many situations, this immediate acknowledgement is highly appreciated by the sender. For example, an order placed with a retailer may not be filled for a week or more. An immediate acknowledgement provides the customer with assurance that their order was received and is being processed.

However, in other situations, an immediate acknowledgement or other partial response is an annoyance. If the communication includes a request that is fulfilled hours, or even minutes later, an immediate acknowledgement is typically of little or no value to the sender. For instance, a customer may request a transfer of funds from one bank account to another using a web-based form, then move on to other web-sites and later log-off without checking their e-mail. A transfer of funds may be accomplished in a short period of time, so the customer will likely have received both an acknowledgement of the request and a confirmation that the transfer was completed by the next time they open their e-mail. These multiple messages may be confusing or annoying to the customer. Thus, a system and method for optimizing timing of responses to customer communications is needed.

SUMMARY OF THE INVENTION

In accordance with the present invention, a system and method are disclosed to optimize timing of responses to customer communications. The invention includes a contact center for receiving communications via various types of communication channels, an operations center for processing the communications, and an agent pool. The operations center comprises a decision module, a response module, queues, and an agent interface. Communications enter the operations center at the decision module, which analyzes each communication and determines whether a partial response, such as an acknowledgement, should be sent. If a partial response should be sent, the decision module forwards the sender's contact information and type of communication to the response module, which responsively sends a partial response to the sender. In the preferred embodiment, the partial response includes an estimate of the time required for a full response to the communication.

If the decision module determines that a partial response is not required, the communication is sent to one of the queues to await processing by an agent. When a partial response is required the decision module also sends the communication to a queue for processing. Each queue preferably stores a certain type of communication. Agents from the agent pool select communications from the queues for processing via the agent interface.

The decision module determines whether a partial response is required based on an estimate of the time required for a full response to the communication. If the time estimate is less than a predetermined threshold, then a partial response is not required. Thus, if a full response may be sent in a reasonable amount of time, a customer or other sender is not sent unnecessary responses. Also, if a partial response is sent, the customer is informed of the time estimate for a full response.

If the full response is not sent before the time estimate expires, the response module may send an additional response to the customer indicating that processing of the full response is in progress. The additional response may also include an additional time estimate for the full response. In this manner, the present invention optimizes timing of responses to customer communications.

DETAILED DESCRIPTION OF THE PREFERRED EMBODIMENT

The present invention includes a system and method for optimizing timing of responses to customer communications.

Figure 1:
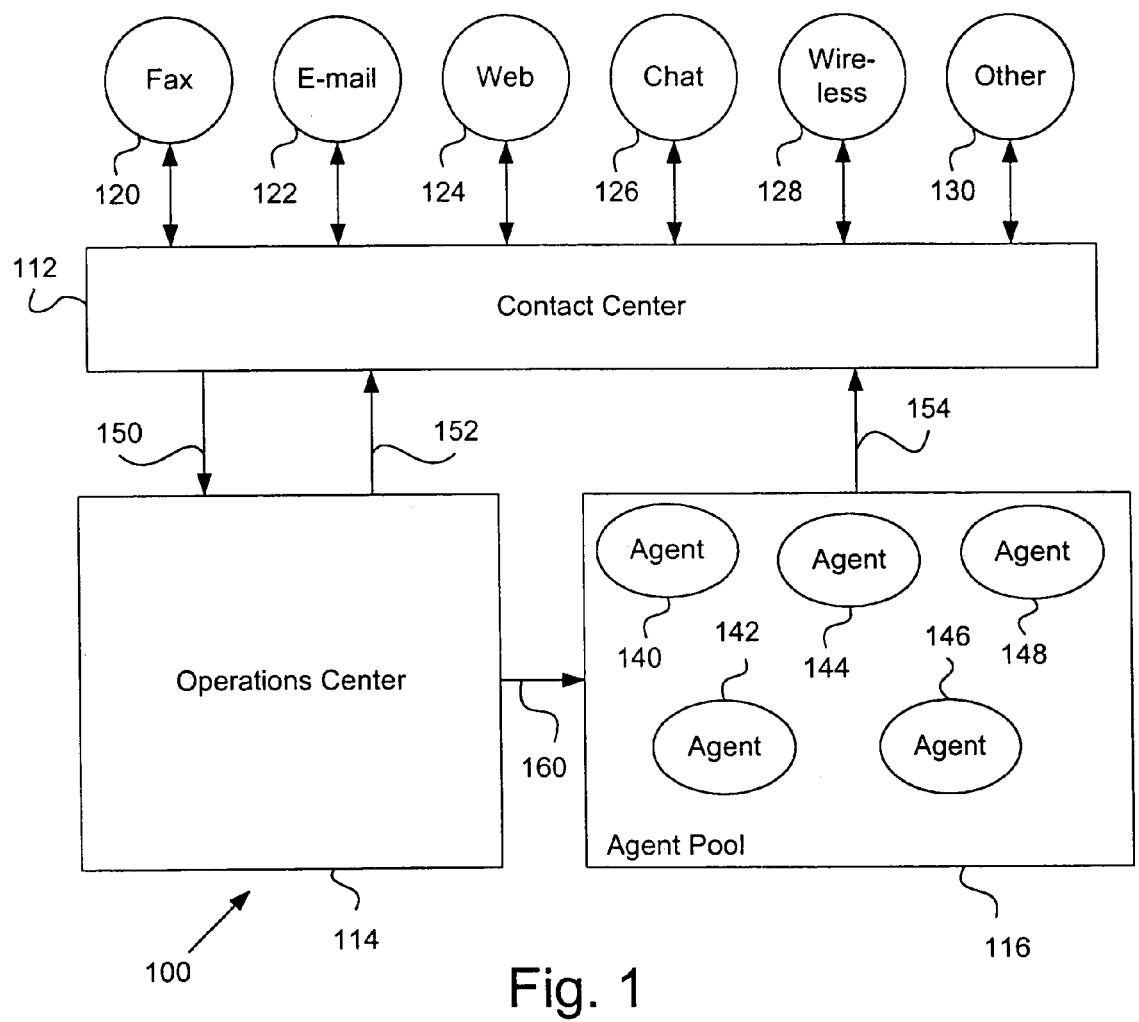
FIG. 1 is a block diagram of one embodiment for an electronic communications system, according to the present invention.

FIG. 1 is a block diagram of one embodiment of an electronic communication system 100 according to the invention. System 100 includes, but is not limited to, a contact center 112, an operations center 114, and an agent pool 116. Contact center 112 may receive and send communications using various communication channels. The channels include, but are not limited to, a facsimile (fax) 120 channel, an E-mail 122 channel, a web-based communication (web) 124 channel, a chat communication (chat) 126 channel, and a wireless 128 communication channel. Other 130 forms of text-based communication channels are within the scope of the present invention.

Contact center 112 forwards communications via path 150 to operations center 114. Agents 140–148 in agent pooh 16 select communications to process from operations center 114 via path 160. Each agent 140 is preferably a skilled person trained to process the types of communications typically received by system 100. Although only five agents are shown in FIG. 1, agent pool 116 may utilize any number of agents.

Communications typically require some form of response, such as a confirmation that an order has been filled or a decision regarding a loan application. Agents 140–148 may compose responses to communications or responses may be generated automatically. Operations center 114 may send automatic responses via path 152 to contact center 112. Agents 140–148 may send composed responses via path 154 to contact center 112. Contact center 112 then forwards the responses to the senders via an appropriate communication channel, such as E-mail 122.

Figure 2:
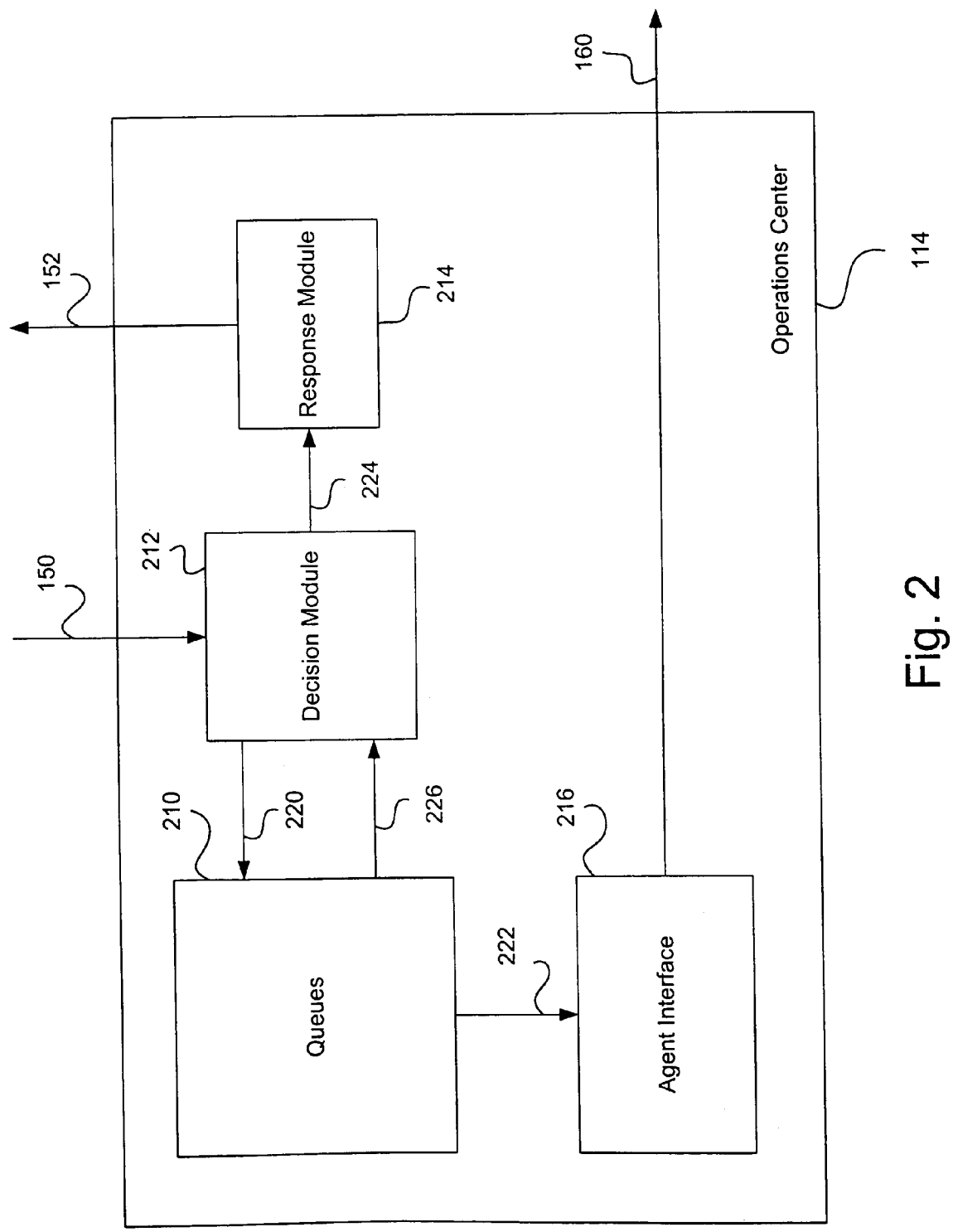
FIG. 2 is a block diagram of one embodiment of the operations center of FIG. 1 according to the invention.

FIG. 2 is a block diagram of one embodiment of the operations center 114 of FIG. 1 according to the invention. Operations center 114 includes, but is not limited to, queues 210, a decision module 212, a response module 214, and an agent interface 216.

Decision module 212 receives communications via path 150. Decision module 212 analyzes each communication and determines whether a partial response, such as an acknowledgement, is required. An acknowledgement is a brief response that indicates to the sender that the communication was received. Another type of partial response may include routine information such as an organization's hours of operation or a request for further information from the sender. If a partial response is not required, decision module 212 forwards the communication via path 220 to queues 210. Operations center 114 may include numerous queues 210 where each queue is assigned to store certain types of communications.

Agents 140–148 select communications to process via path 222, agent interface 216, and path 160. Agents 140–148 process the communications and send any required full responses to customers through contact center 112. The responses may be in the form of an automatic, or canned, reply to a routine request, or in the form of a more individualized, content-rich reply composed by an agent.

When decision module 212 determines that a partial response is required, decision module 212 forwards information identifying the sender and type of request via path 224 to response module 214. Decision module 212 then forwards the communication to queues 210 for processing by agents 140–148.

In the preferred embodiment of the present invention, decision module 212 determines whether a communication requires a partial response according to an estimate of the time required for a full response. If the time estimate for a full response to the communication is lower than a predetermined threshold, then decision module 212 determines that a partial response is not required. Thus, a customer or other sender does not receive multiple communications when a single communication will address their needs. In this way, a user of system 100 is able to provide good service to its customers and other senders without unnecessary and perhaps annoying communications. In another embodiment, decision module 212 may also determine whether a communication requires a partial response based on the subject matter of the communication.

Decision module 212 estimates the time required for a full response based on the content of the communication and how such communications are typically processed. For example, if a communication is typically processed by sending an automatic reply, then processing that communication will take less time than a communication requiring an agent-composed response. Various types of communications that require agent-composed responses may differ in the amount of time required for processing. The amount of time required may depend on the difficulty of the issue needing to be resolved and how often that issue appears in communications. Issues that appear rarely may take more time to process than routine issues.

The amount of time required to process a communication may also depend on the number of communications in queues 210 waiting to be processed. If queues 210 contain a large number of communications, any newly received communications may remain in queues 210 a significant amount of time before being processed. Each queue in queues 210 may contain a particular type of communication. If one queue contains a large number of communications, a communication sent to that queue may remain in the queue longer than another communication may remain in another queue containing fewer communications.

The threshold for determining whether a partial response is required is predetermined by a user of system 100. The value of the threshold may be adjusted at any time to meet the needs of the system user. The system user may determine that the number of partial responses being sent by response module 214 is too high or too low. The value of the threshold may then be adjusted to decrease or increase the number of partial responses.

Response module 214 may send an acknowledgement to the sender indicating that the communication was received. The acknowledgement may include the type of communication received, which may aid the sender in identifying which communication is being acknowledged in the case of multiple communications by one sender. The acknowledgement may also include an estimate of the time required for a full response to the communication, as determined by decision module 212.

Decision module 212 may be implemented as a rule-based system that analyzes the communications and applies rules established by the system user to estimate the time required for a full response. In another embodiment, decision module 212 uses keywords to analyze the communication and estimate the time required for a full response. In another embodiment, decision module 212 utilizes an agent who analyzes each incoming communication and makes a manual decision when a partial response is required based on rules established by the system user.

In the preferred embodiment, decision module 212 is a learning system that analyzes the language of the communication. The preferred embodiment of decision module 212 also learns from feedback which communications require a partial response. Decision module 212 may monitor the actual time elapsed for a full response to be sent and learn what type of communications require a response time less than the threshold value. Such a learning system is described in U.S. Provisional Patent Application No. 60/176,411, filed Jan. 13, 2000, entitled "System And Method For Effective And Efficient Electronic Communication Management," which is hereby incorporated by reference.

Sometimes a communication may remain in queues 210 longer than the time estimate for a full response determined by decision module 212. Decision module 212 may monitor queues 210 via path 226 to identify communications whose time estimate has expired. Decision module 212 may then determine another time estimate for a full response to the communication and forward this estimate to response module 214. Response module 214 may then send another partial response to the sender indicating that the communication is still being processed and the new time estimate for a full response. Response module 214 may send as many partial responses as needed before a full response is sent. The number and frequency of partial responses may be determined by the system user.

Figure 3:
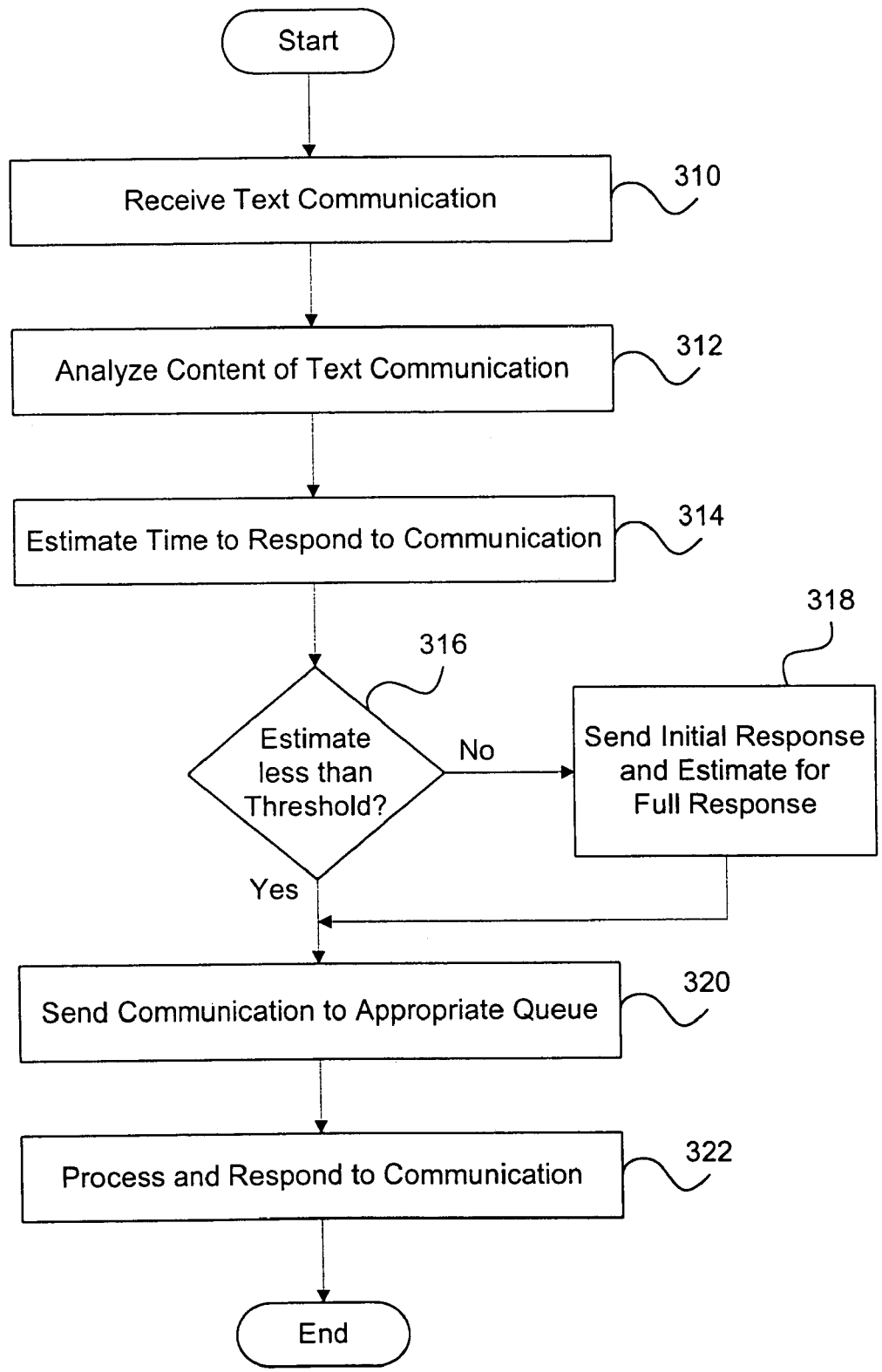
FIG. 3 is a flowchart of method steps for optimizing timing of responses to customer communications according to one embodiment of the invention.

FIG. 3 is a flowchart of method steps for optimizing timing of responses to communications according to one embodiment of the invention. First, in step 310, contact center 112 receives a text communication from a sender. In step 312, decision module 212 analyzes the content of the text communication. Then, in step 314, decision module 212 estimates the amount of time required to respond fully to the communication. The time estimate may be based on the subject matter of the communication, queue depth, or whether an automatic reply is sufficient.

Next, in step 316, decision module 212 compares the time estimate with a threshold value. If the estimate is less than the threshold, then, in step 320, decision module 212 sends the communication to the appropriate queue in queues 210. If the estimate is not less than the threshold, then, in step 318, response module 214 sends a partial response to the sender, for example an acknowledgement that the communication was received. The partial response preferably also includes the time estimate for a full response to the communication.

The FIG. 3 method then continues with step 320, where decision module 212 sends the communication to the appropriate queue in queues 210. Then, in step 322, an agent 140 selects the communication from the queue in turn to process and respond to the communication. In this manner, the method of the present invention optimizes timing of responses to communications.

Figure 4:
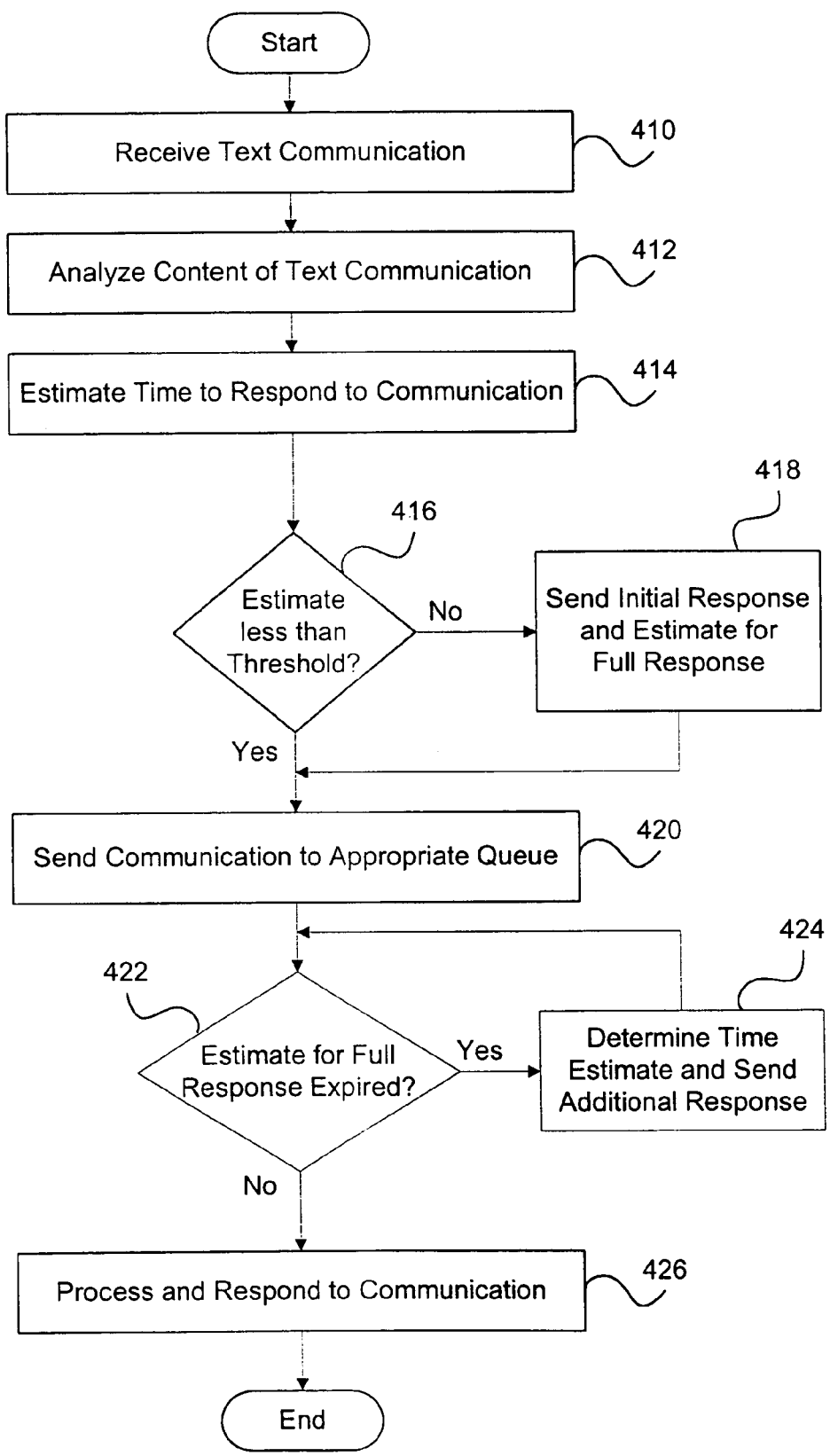
FIG. 4 is a flowchart of method steps for optimizing timing of responses to customer communications according to another embodiment of the invention.

FIG. 4 is a flowchart of method steps for optimizing timing of responses to customer communication according to another embodiment of the present invention. First, in step 410, contact center 112 receives a text communication from a sender. In step 412, decision module 212 analyzes the content of the text communication. Then, in step 414, decision module 212 estimates the amount of time required to respond fully to the communication. The time estimate may be based on the subject matter of the communication, queue depth, or whether an automatic reply is sufficient.

Next, in step 416, decision module 212 compares the time estimate with a threshold value. If the estimate is less than the threshold, then, in step 420, decision module 212 sends the communication to the appropriate queue in queues 210. If the estimate is not less than the threshold, then, in step 418, response module 214 sends a partial response to the sender, for example an acknowledgement that the communication was received. The partial response preferably also includes the time estimate for a full response to the communication.

The FIG. 4 method then continues with step 420, where decision module 212 sends the communication to an appropriate queue in queues 210. In step 422, decision module 212 determines whether the time estimate for a full response to the communication has expired. If the time estimate has expired, then in step 424 decision module 212 determines another time estimate and response module 214 sends an additional partial response to the sender. If the time estimate for a full response has not expired, then in step 426, an agent 140 selects the communication in turn to process and respond to the communication.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for optimizing timing of responses to communications, comprising:
   a contact center configured to receive a text-based communication from a sender;
   a decision module configured to determine whether a partial response to the communication is required, wherein the determination comprises the decision module analyzing content of the communication by identifying at least a keyword; and
   a response module configured to send the partial response to the sender, if required.

2. The system of claim 1, wherein the decision module further determines a response time estimate for the communication, and if the response time estimate is less than a threshold value, then no partial response is required and the communication is forwarded to a queue for processing by an agent.

3. The system of claim 2, wherein the partial response is required if the response time estimate is greater than or equal to the threshold value.

4. The system of claim 2, wherein if the partial response is required, the decision module further forwards the communication to a queue for processing by an agent.

5. The system of claim 4, wherein the response module sends another partial response if a full response to the communication is not sent before the response time estimate expires.

6. The system of claim 2, wherein the decision module further analyzes content of the communication to determine the response time estimate.

7. The system of claim 6, wherein the decision module determines the response time estimate according to a set of rules predetermined by a system user.

8. The system of claim 6, wherein the decision module is a learning system configured to determine the response time estimate utilizing feedback.

9. The system of claim 6, wherein the decision module includes an agent configured to analyze the communication and determine the response time estimate.

10. The system of claim 2, wherein the response time estimate is based on a number of prior communications in the queue.

11. The system of claim 2, wherein the response time estimate is based on whether a full response to the communication is an automatic reply.

12. The system of claim 2, wherein the partial response includes the response time estimate.

13. The system of claim 1, wherein the partial response comprises an acknowledgement that the communication was received.

14. A method for optimizing timing of responses to communications, comprising:
   receiving a text-based communication from a sender;
   determining whether the communication requires a partial response, whereby a decision module analyzes content of the communication by identifying at least a keyword; and
   sending the partial response to the sender, if required.

15. The method of claim 14, wherein determining whether the communication requires a partial response further comprises determining a response time estimate for the communication, and if the response time estimate is less than a threshold value, then no partial response is required and the communication is forwarded to a queue for processing by an agent.

16. The method of claim 15, wherein the partial response is required if the response time estimate is greater than or equal to the threshold value.

17. The method of claim 15, wherein if the partial response is required, the communication is forwarded to a queue for processing by an agent.

18. The method of claim 17, further comprising sending another partial response if a full response to the communication is not sent before the response time estimate expires.

19. The method of claim 15, wherein a decision module further analyzes content of the communication to determine the response time estimate.

20. The method of claim 19, wherein the decision module determines the response time estimate according to a set of rules predetermined by a system user.

21. The method of claim 19, wherein the decision module is a learning system configured to determine the response time estimate utilizing feedback.

22. The method of claim 19, wherein the decision module comprises an agent configured to analyze the communication and determine the response time estimate.

23. The method of claim 15, wherein the response time estimate is based on a number of prior communications in the queue.

24. The method of claim 15, wherein the response time estimate is based on whether a full response to the communication is an automatic reply.

25. The method of claim 15, wherein the partial response comprises the response time estimate.

26. The method of claim 14, wherein the partial response comprises an acknowledgement that the communication was received.

27. A system for optimizing timing of responses to communications, comprising:
   means for receiving a text-based communication from a sender;
   means for determining whether the communication requires a partial response, wherein the determining means analyze content of the communication by identifying at least a keyword; and
   means for sending the partial response to the sender if required.

28. The system of claim 27 wherein if the partial response is required, the communication is forwarded for processing by agent means.

* * * * *